Sept. 12, 1967  B. E. PATON ETAL  3,341,685
METHOD AND DEVICE FOR AUTOMATIC CONTROL
OF RESISTANCE-BUTT WELDING
Filed May 15, 1964

3,341,685
METHOD AND DEVICE FOR AUTOMATIC CONTROL OF RESISTANCE-BUTT WELDING

Boris Evgenjevich Paton, Ulitsa Kotsjubinskogo 9, Apt. 21; Oleg Vasiljevich Popovsky, Laboratorny pereulok 24, Apt. 22; and Sergei Ivanovich Kuchuk-Jatsenko, Ulitsa Vyshgorodskaja 4/1, Apt. 70, all of Kiev, U.S.S.R.
Filed May 15, 1964, Ser. No. 367,785
3 Claims. (Cl. 219—104)

The present invention relates to the method employed for obtaining automatic control of resistance butt-welding machines by flashing and apparatus therefor, in particular when welding thick workpieces of a compact cross-section.

We do take into account the fact that prior to our invention various methods have been known to provide automatic control of the resistance butt-welding machine with the welding condition parameters being altered as each welding cycle proceeds and according to a preset program.

However, said solutions of the problem have been deficient in that the welding process is not sufficiently steady, the zone of heating is not a constant value for all the workpieces to be welded and the quality of the weld is far from being of uniformly good quality. Besides, change-over for new welding conditions, when proceeding to another type or size of the workpiece, requires much work and is difficult.

The object of this invention is to provide for a high quality of welds resulted from a steady process of welding and a constant value of heating zone of the workpieces to be welded.

Another object of this invention is to simplify the process of the machine tuning for another welding condition due to changing either the type or the size of the workpiece to be welded.

Still another object of this invention is to make it possible to simplify the machine controls and, more particularly, to provide opportunities for successful use of various programming units.

In conformity with these and other objects the invention comprises a new method and an apparatus to perform said method. It will be understood that various modifications of the described invention may be effected by those skilled in the art without departing from the principle and scope of the invention as described in the appended claims.

Other objects and advantages of the invention will be appreciated upon reading the following description which is taken in conjunction with the accompanying drawings in which.

Figure 1A:
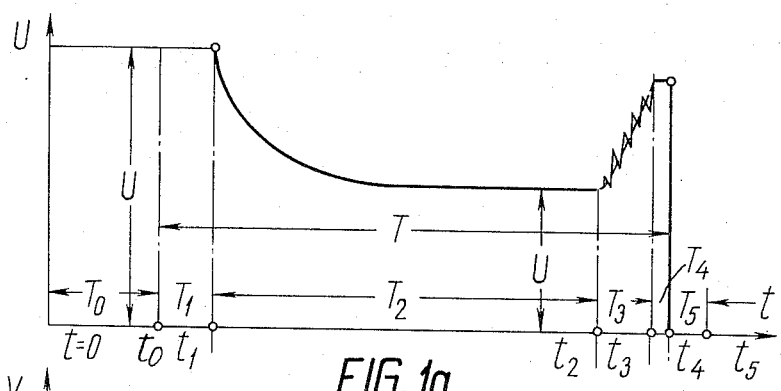
FIG. 1a is a diagram of the predetermined voltage change on the welding machine clamping jaws.

The welding cycle under consideration comprises four periods with the durations being $T_1$, $T_2$, $T_3$, and $T_4$ respectively, (FIG. 1a).

The process of welding begins with the $t=0$ and the programming unit being inoperative. The faces of the workpieces under welding should be flashed first to remove any possible roughnesses therefrom. This done, flashing of the whole section takes place under an increased welding current as illustrated in FIG. 1c (point $t_0$). Now the programming unit comes into actuation and changing of the welding condition parameters begins in accordance with a predetermined program. During the first period, i.e., from $t_0$ till $t_1$ the parameters of welding condition are maintained constant as prescribed by the programming device, whereas the duration of $T_1$ is assigned proceeding from both the size and shape of the work.

The second period of the program embraces the time from $t_1$ till $t_2$. During said period the voltage U on the welding machine clamping jaws is changed in compliance with the prescribed program, e.g. as shown in FIG. 1a. All the other parameters of the welding condition during the second period with the duration of $T_2$ are kept constant.

Figure 1B:
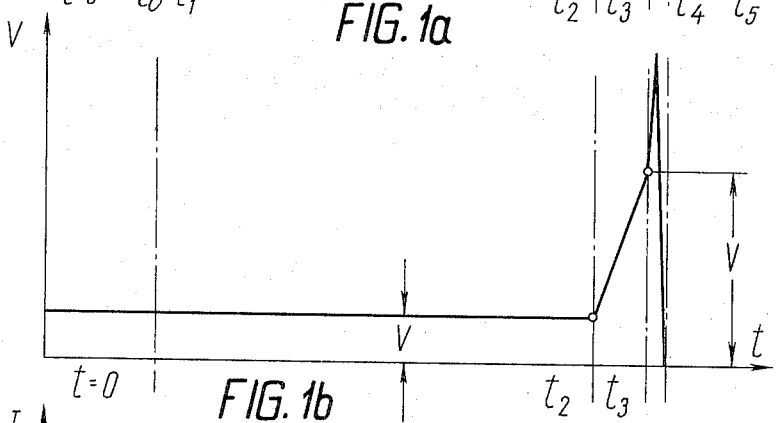
FIG. 1b is a diagram of the predetermined displacement rate change of the welding machine movable clamper.
Figure 1C:
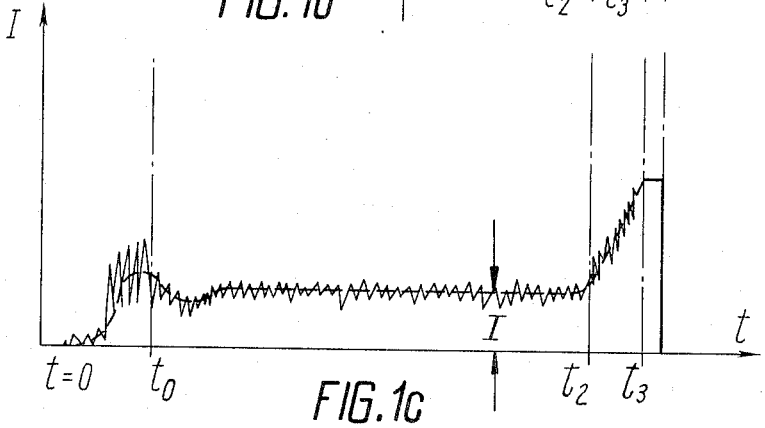
FIG. 1c is a diagram of the predetermined change of the welding current.

In the course of the third period embracing the time from $t_2$ till $t_3$, the displacement rate V of the movable clamp of the welding machine is changed in conformity with the prescribed program, e.g. as shown in FIG. 1b. The welding current is altered by changing both the voltage U on the welding machine clamping jaws and the displacement rate V of the movable clamp.

The fourth period which is an upsetting stage has a duration of $T_4$ and embraces the time from $t_3$ till $t_4$. In the course of said period a linear upsetting value 1 of the welded workpiece as well as the duration of welding current feed are determined by the programming unit.

Each of the above described periods is preset by an individual programming device.

As has already been mentioned a particular program is needed for each size and type of the workpiece to be welded.

Figure 2:
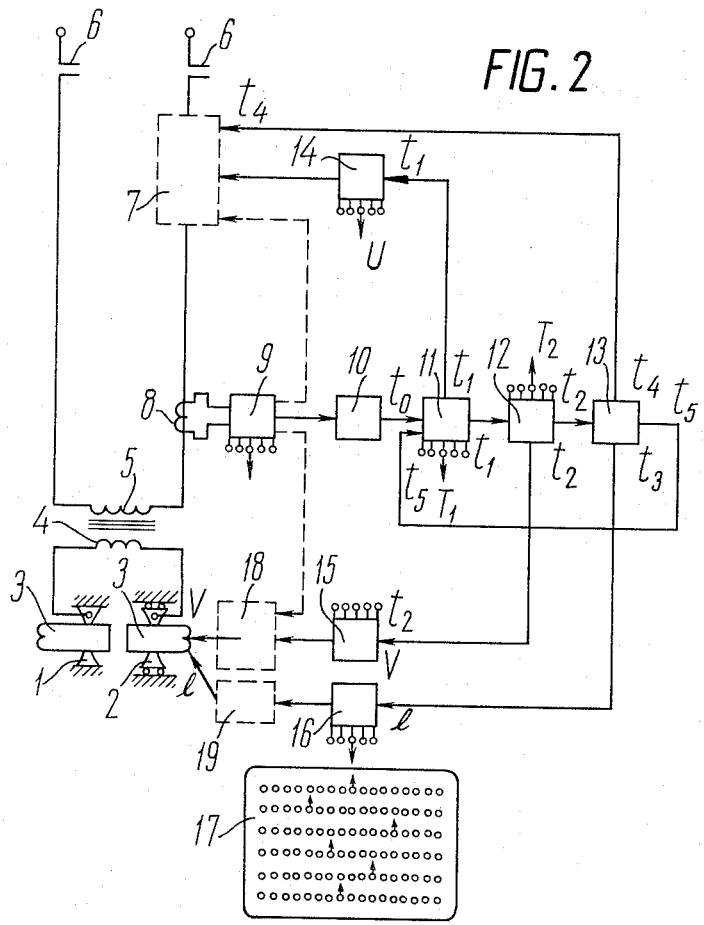
FIG. 2 is a structural design diagram of the apparatus to perform the suggested method.

To perform the suggested method of automatic control a programming unit can be employed whose structural diagram is illustrated in FIG. 2. The welding circuit comprises, as usual, stationary 1 and a movable 2 clamping jaws both intended to fasten the workpiece 3 under welding. The secondary winding 4 of the welding transformer is connected to the welding machine clamps whereas the primary winding 5 is connected to an A.C. source through contractor 6. A voltage regulator 7, (for instance, of the ignitron type with the control of burning phases of said ignitrons) and current transformer 8 are provided in the primary circuit of the welding transformer. Said programming unit comprises a measurement means 9, program triggering unit 10, timers 11 and 12, for instance electronic with programming time delay, multi-circuit time delay relay 13, e.g. driven by an electric motor, voltage programming unit 14, speed programming unit 15, upsetting value programming unit 16 and a program prescribing unit 17 made in the shape of a double-sided system of spring-loaded contacts separated by means of a stationary card with apertures thereon.

The contacts of each track have a power connection with the corresponding units of the circuit wherein a particular program is predetermined for the particular welding condition parameter.

The apertures punched on the tracks of said card determine the settings of all the parameters of welding condition for the particular type of the work.

The program for each parameter is conventionally shown in FIG. 2 by an arrow running from the contact track to the corresponding unit of the circuit.

When passing on to welding other types of workpieces, care should be taken to position the card with all the parameters of the new welding condition thereon.

Both the speed regulator 18 and upsetting drive 19 are integral parts of the welding machine design and provide for the workpiece feed with the predetermined rate and upsetting.

The mode of action of the suggested machine and the programming unit is as follows:

Upon switching on the welding machine the clamp 2 with the work moves slowly towards the stationary clamp 1. The voltage regulator 7 is cut out and does not participate in the operation. As soon as the faces of the welded workpieces contact each other flashing begins. Welding current becomes more intensive as the roughnesses are removed from the faces of the workpieces to be welded. The measuring means 9 connected to current transformer 8 transmits a signal to the program triggering unit 10 which measures the integral current magnitude per a definite period of time and transmits an initiating signal to the input of the electronic time delay relay 11 which starts counting the first period of the program. The use of initiating unit 10 gives an opportunity to exclude from the total period of welding cycle T an indefinite period required for preliminary flashing to remove roughnesses from the faces of the welded workpiece.

As soon as the period of time $T_1$ elapses the relay 11 transmits a signal for cutting in the voltage regulator 7 through a programming step-down voltage unit 14. Simultaneously with this a signal is sent to start the relay 12 which begins counting the time of the second stage $T_2$ corresponding to the operation of the movable clamp displacement at the previous rate with the voltage on the welding machine clamping jaws changing in accordance with the predetermined program.

As soon as the period of time $T_2$ is over, at the time of $t_2$, the relay 12 transmits a signal for a predetermined increase of the displacement rate of the movable clamp prior to the process of upsetting. Meantime another signal is transmitted for starting the multi-circuit time delay relay 13 which determines the operations to be carried out at certain periods of time, e.g. upsetting under current at the time of $t_3$, cutting out voltage circuit at the time of $t_4$, switching the relays 11 and 12 into the initial position at the time of $t_5$, etc.

The voltage programming unit 14 and rate programming unit 15 operate on the principle of changing the internal resistance of the triodes during capacitor discharge in the control circuit. The unit of the linear upsetting value programming is actuated by program transmitters accommodated in the upsetting drive 19.

Figure 3:
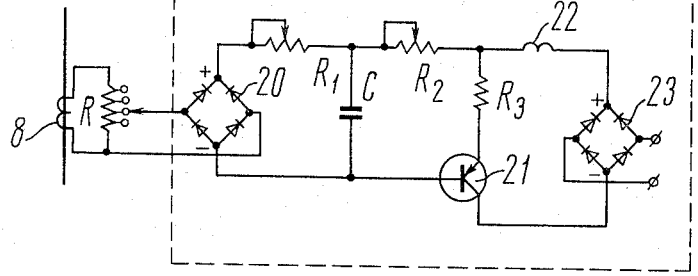
FIG. 3 is a diagram of the triggering unit.

The program triggering unit represents a device intended for measuring the integral magnitude of the welding current and it can be manufactured, for instance, in accordance with the design diagram illustrated in FIG. 3.

The current transformer 8 connected to the circuit of the welding machine charges the condenser C through rectifier 20 and resistor $R_1$. The time constant of the $R_1$–C integrating network is chosen so as to provide voltage charging of capacitor C by the time the flashing of the whole cross-section of the workpiece begins, said voltage being sufficient for transistor 21 to open and unit 22 to operate.

The transistor 21 acts as an intermediate amplifier and permits to create a high-resistance load comprising $R_2$ and $R_3$ and at which condensator C voltage may be regarded approximately proportional to the integral of voltage which is taken off from the current transformer 8. To feed the collector circuit 21 and relay winding 22, a rectifier 23 is provided in the circuit, whose input is connected to the A.C. source.

The suggested method of automatic control of the resistance butt-welding machine by the method of flashing and the apparatus used to perform said method ensure a stable heating of the welded workpieces and permanent good quality of welding even when dealing with the workpieces having large and compact cross-sections.

The suggested method and the apparatus heretofor permit to automate the welding process and increase the machine efficiency, while reducing the time for retuning the machine when passing on to other types of work.

The suggested method ensures successful use of simple and effective equipment for automation and programming the welding process including simple apparatus for recording the programs on special cards.

With the suggested method, more economical welding machines operating in accordance with the method of flashing can successfully be put into practice.

Application of similar-type welding machines in metallurgical plants for welding an assortment of non-measured rolled stock into blanks of measured length will be of great economical value.

What we claim is:

1. A method of automatic control of a straight flash-welding process wherein the welding cycle consists of the following consecutive stages:

(a) preparatory stage, during which the workpieces to be welded are moved together at a comparatively low constant speed while applying an alternating voltage of a magnitude sufficient to begin flashing of the cold ends of the workpieces to be welded and smooth out the irregularities thereon, the end of the preparatory stage being determined when a predetermined preset integral value of the welding current has flowed through the workpieces;

(b) first stage, whose duration commences from the beginning of the flashing over the entire end section area of the workpieces being welded, and wherein the same voltage and advancing speed are maintained, as during the previous preliminary stage, for a sufficient time, depending on the dimensions and configuration of the workpieces being welded, to insure uniform heating of the entire surface being flashed;

(c) second stage, wherein the advancing speed is kept at the previous level, while the voltage is reduced by a value adequate for maintaining the intensity of the welding current not less than that during the said first stage, and for continuing stable flashing of the workpieces;

(d) third stage, wherein to increase the intensity of flashing of the workpiece the advancing speed is increased and simultaneously the voltage is raised to a level close to the value of the voltage during the said preparatory and first stages;

(e) fourth stage, wherein upsetting is performed with a preset upset travel and upset current time.

2. A device for the automatic control of a straight flash welding process, said device comprising two clamps for holding workpieces to be welded, one of said clamps being movable and the other one fixed; a welding transformer connected to said clamps; means for controlling the welding voltage supplied to said welding transformer; means for controlling the speed of feeding said movable clamp toward the fixed clamp, means for controlling the travel of said movable clamp during upsetting; separate programming units in each of said means for controlling the voltage, the means for controlling the speed and the means for controlling the travel of said movable clamp during upsetting; a measuring current transformer connected to the feed circuit of said welding transformer, a group of series-connected time relays selectively connected to said programming units for controlling the duration of their operation in accordance with a preset program; a triggering unit connected between the output of said measuring current transformer and said group of time relays for switching on one of said time relays at the moment when flashing commences over the entire end section of the workpieces being welded.

3. A device as set forth in claim 2, wherein said triggering unit comprises a rectifier whose output voltage is proportional to the welding current; an integrating circuit connected to said rectifier; an operating relay connected to said integrating circuit and one of said time relays, and a transistor that amplifies the signal fed from said integrating circuit to said operating relay, said integrating circuit comprising resistors and a capacitor and having a time constant to insure said capacitor being charged to a voltage sufficient for switching on said transistor and for actuation of said operating relay at the moment when flashing commences over the entire surface of the ends of the workpieces being welded.

References Cited

UNITED STATES PATENTS

| | | | |
|---|---|---|---|
| 2,727,969 | 12/1955 | Platte | 219—100 X |
| 2,829,233 | 4/1958 | Doutt | 219—97 |
| 2,945,940 | 7/1960 | Schlatter | 219—100 |
| 3,015,021 | 12/1961 | Wängsjö | 219—97 |

RICHARD M. WOOD, *Primary Examiner.*

B. A. STEIN, *Assistant Examiner.*